United States Patent [19]

Minot

[11] 4,048,480

[45] Sept. 13, 1977

[54] GENERATORS OF ANHARMONIC BINARY SEQUENCES

[76] Inventor: Pierre J. M. Minot, 10, rue Monmousseau, 94200 Ivry, France

[21] Appl. No.: 681,911

[22] Filed: Apr. 30, 1976

[30] Foreign Application Priority Data

Apr. 30, 1975 France .............................. 75.13691

[51] Int. Cl.² ............................................ G06F 15/34
[52] U.S. Cl. .................................... 235/152; 84/1.01
[58] Field of Search ................ 235/152, 156; 84/1.01, 84/1.03, 1.22

[56] References Cited

U.S. PATENT DOCUMENTS

| | | | |
|---|---|---|---|
| 3,809,788 | 5/1974 | Deutsch | 84/1.01 |
| 3,809,789 | 5/1974 | Deutch | 84/1.01 |
| 3,888,153 | 6/1975 | Deutsch | 235/152 X |

*Primary Examiner*—Jerry Smith

[57] ABSTRACT

Generators of anharmonic binary sequences having predetermined harmonics equal to zero. Orders and modes of anharmonicity are defined. Generators are disclosed, permitting to generate sequences anharmonic at successive determined orders according to previously selected modes.

6 Claims, 31 Drawing Figures

Fundamental harmonic of 10 100

Second harmonic of 10 100

Third harmonic of 10 100

Fourth harmonic of 10 100

Fifth harmonic of 10 100

Fundamental harmonic
of 10 110 100

Second harmonic
of 10 110 100

Fundamental harmonic
of 101110100000

Second harmonic
of 101110100000

20 bit even sequence 14 bit even sequence

GENERATORS OF ANHARMONIC BINARY SEQUENCES

BACKGROUND OF THE INVENTION

The present invention generally concerns means for generating binary sequences approximating a sine function and more particularly means for generating binary sequences having spectra whose line amplitudes up to a given harmonic order have zero values.

These binary sequences will be called in the following anharmonic sequences since their first, second ... $k^{th}$ ($k$ being selected at will) harmonics are equal to zero.

Let us consider a sequence of N non return to zero binary digits, the duration of the digits being $1/f$ and the duration T of the sequence being $$T = \frac{1}{F} = \frac{N}{f}$$

and let us designate by $s_i$ the binary value of the $i^{th}$ digit of the sequence ($0 \leq i \leq N-1$).

The sequence can be expanded into a Fourier series:

$$s(t) = \sum_{k=0}^{+\infty} S(kF) e^{-2\pi jkFt}$$

where $j = \sqrt{-1}$ and the amplitude of the spectrum line of order $k$ $S(kF)$ is given by:

$$S(kF) = \frac{1 - e^{-2\pi jkFT/N}}{2\pi jkFT} \sum_{i=0}^{N-1} s_i e^{-2\pi jik/N} \qquad (1)$$

The first factor in the second side of equation (1) is typically a sin $x/x$ digital waveform signal which vanishes when the order $k$ of the harmonic is equal to the number of bits N of the sequence or a multiple of this number whichever be the selected sequence. The second term in this second side $$\sum_{i=0}^{N-1} s_i e^{-2\pi jik/N}$$

denotes the sum of N complex numbers of modulus 0 or 1.

Sequences can be selected in such a way that the amplitude of a harmonic of predetermined order $k$ vanishes. As indicated in the foregoing, it will be said that such a sequence is anharmonic at said predetermined order or orders.

The method for defining these anharmonic sequences is apparently new and will be detailed in two sections according to the approach involved.

SECTION 1

Representation of Sequences by a Vectorial Approach

The $k^{th}$ line of the spectrum of a sequence of N bits can be represented by a vectorial pattern comprising as many vectors as nonzero bits in the sequence, the vector representing the bit of serial number $i$ in the sequence having an argument equal to $2\pi ik/N$.

First Example (FIGS. 1a to 1e)

Referring in anticipation to FIGS. 1a to 1e, FIG. 1a represents the fundamental harmonic of the spectrum of the sequence $$1\,0\,1\,0\,0 \qquad (N=5) \qquad (2)$$

The representation comprises two vectors having a modulus equal to unity and arguments equal to $2\pi ik/N$ with $k=1$ and $i=0$ and 2, i.e. arguments equal to 0 and $4\pi/5$.

The second harmonic of the sequence is represented in FIG. 1b by two vectors having a modulus equal to unity and arguments equal to $(2\pi/N) \times k \times i$ with $k=2$ and $i=0$ and 2, i.e. 0 and $8\pi/5$.

The third harmonic of the sequence is represented in FIG. 1c by two vectors having a modulus equal to unity and arguments equal to $(2\pi/N) \times k \times i$ with $k=3$ and $i=0$ and 2, i.e. 0 and $12\pi/5 = 2\pi/5$.

The fourth harmonic of the sequence is represented in FIG. 1d by two vectors having a moudlus equal to unity and arguments equal to $(2\pi/N) \times k \times i$ with $k=4$ and $i=0$ and 2, i.e. 0 and $16\pi/5 = 6\pi/5$.

Finally, one finds in FIG. 1e that the $5^{th}$ line of the spectrum is represented by two superimposed vectors of modulus equal to unity and arguments soth equal to zero, i.e. by a vector of modulus equal to 2 and argument equal to zero.

In FIGS. 1a to 1e, the resultant of the two vectors is never zero and therefore sequence (2) has no anharmonicity in any order from 1 to 5 inclusively.

Second Example (FIGS. 2a and 2b)

Let us take now the bit sequence $$1\,0\,1\,1\,0\,1\,0\,0 \qquad (N=8) \qquad (3)$$

Its fundamental harmonic (FIG. 2a) comprises four unity vectors of arguments 0, $(2\pi/8) \times 2$, $(2\pi/8) \times 3$ and $(2\pi/8) \times 5$ and its second harmonic (FIG. 2b) comprises four unity vectors of arguments 0, $(2\pi/8) \times 2 \times 2 = \pi$ $(2\pi/8) \times 3 \times 2 = (3\pi/2)$ and $(2\pi/8) \times 5 \times 2 = (5\pi/2) = \pi/2$ (modulo $2\pi$). The sum of the four vectors in FIG. 2b is equal to zero and sequence (3) is therefore anharmonic at order 2.

Third Example (FIGS. 3a and 3b)

Let us last of all take the bit sequence $$1\,0\,1\,1\,1\,0\,1\,0\,0\,0\,0\,0 \qquad (N=12) \qquad (4)$$

Its fundamental harmonic (FIG. 3a) comprises five unity vectors of arguments:

$$0 \;\; \pi/3 \;\; \pi/2 \;\; 2\pi/3 \;\; \pi$$

and its second harmonic (FIG. 3b) comprises five unity vectors of arguments $$0 \quad \frac{8\pi}{12} = \frac{2\pi}{3} \quad \frac{12\pi}{12} = \pi \quad \frac{16\pi}{12} = \frac{4\pi}{3} \quad \frac{24\pi}{12} = 2\pi.$$

The sum of the five vectors of FIG. 3b is equal to zero since the three vectors of arguments 0, $2\pi/3$ and $4\pi/3$ are three-phased and the two vectors of arguments $\pi$ and $2\pi$ are two-phased. Therefore, sequence (4) is anharmonic at order 2.

Theorem

A sequence anharmonic at order $k$ has a number of bits multiple of $k$.

Definition of the Anharmonicity Mode

The vectorial diagram of a $k$-order anharmonic sequence comprises a set of vectors whose resultant is zero. It may occur that the vector set can be partitioned into subsets of vectors whose resultants are zero. For example, two opposite vectors, three three-phased vectors, four four-phased vectors have a zero resultant. The number of vectors of a zero resultant set or subset of vectors is called the anharmonicity mode. The numbers which define the anharmonicity modes are prime numbers.

The modes of the anharmonicity of order 2 in FIG. 2b is 2 and 2. The mode of the anharmonicity of order 2 in FIG. 3b is 2 and 3. In the following, the order of anharmonicity will be denoted by $k$ and the mode of anharmonicity will be denoted by $p$.

Induced Anharmonicity

It can be proved that if a sequence is anharmonic at order $k$ according to mode $p$, it is also anharmonic at order $nk$ according to mode $p$, $n$ being a positive integer non multiple of $p$. Therefore anharmonicity of a sequence at certain orders according to a given mode involves anharmonicity at other higher orders. These higher order anharmonicities are called induced anharmonicities.

The following table gives for anharmonicity modes $p = 2, 3$ and $5$, the lower anharmonicity orders $k$ and the higher induced anharmonicity orders $nk$:

| Anharmonicity mode | Lower Anharmonicity order | Higher Anharmonicity orders (induced anharmonicities) |
| --- | --- | --- |
| $p = 2$ | $k = 2$ | $nk = 6, 10, 14, 18, 22...$ |
|  | $k = 3$ | $nk = 9, 15, 21, 27, 33...$ |
|  | $k = 4$ | $nk = 12, 20, 28, 36, 44...$ |
|  | $k = 5$ | $nk = 15, 25, 35, 45, 55...$ |
|  | $k = 6$ | $nk = 18, 30, 42, 54, 66...$ |
|  | $k = 7$ | $nk = 21, 35, 49, 63, 77...$ |
|  | $k = 8$ | $nk = 24, 40, 56, 72, 88...$ |
| $p = 3$ | $k = 2$ | $nk = 4, 8, 10, 14, 16,...$ |
|  | $k = 3$ | $nk = 6, 12, 15, 21, 24,...$ |
|  | $k = 4$ | $nk = 8, 16, 20, 28, 32,...$ |
|  | $k = 5$ | $nk = 10, 20, 25, 35, 40,...$ |
|  | $k = 6$ | $nk = 12, 24, 30, 42, 48,...$ |
|  | $k = 7$ | $nk = 14, 28, 35, 49, 46,...$ |
|  | $k = 8$ | $nk = 16, 32, 40, 56, 64,...$ |
| $p = 5$ | $k = 2$ | $nk = 4, 6, 8, 12, 14,..$ |
|  | $k = 3$ | $nk = 6, 9, 12, 18, 21,...$ |
|  | $k = 4$ | $nk = 8, 12, 16, 24, 28,...$ |
|  | $k = 5$ | $nk = 10, 15, 20, 30, 35,...$ |
|  | $k = 6$ | $nk = 12, 18, 24, 36, 42,...$ |
|  | $k = 7$ | $nk = 14, 21, 28, 52, 49,...$ |
|  | $k = 8$ | $nk = 16, 24, 32, 48, 56,...$ |

SECTION 2

Representation of Sequences by a "Polynomials over Finite Fields"—Approach

A digital sequence can be represented by an associated polynomial $$P = \sum_{i=0}^{N-1} s_i X^i$$

through the transformation of variable $e^{-2\pi j/N}$ to variable X. These polynomials are defined over a two element Galois field. For example, the sequence $$1\ 0\ 1\ 0\ 0 \quad (N = 5) \tag{2}$$

is represented by the polynomial $$1 + X^2$$

The polynomial associated to the $k$-order harmonic of the sequence is the polynomial $$P_k = \sum_{i=0}^{N-1} s_i X^{ki}$$

SUMMARY OF THE INVENTION

The object of the invention is to synthetize binary sequences deerived from a given starting binary sequence and having, further to the anharmonicities of said starting sequence, an anharmonicity at order $k$ according to mode $p$.

Another object of the invention is to synthetize binary sequences derived from a given starting sequence already anharmonic at order $k_1, k_2, \ldots k_{m-1}$ according respectively to modes $p_1, p_2, \ldots p_{m-1}$, and having a further anharmonicity at the order $k_m$ according to a mode $p_m$.

Another object of the invention is to provide amplitude modulation means in which both the carrier signal and the modulating signal are anharmonic.

Synthesis of Anharmonic Sequences by Vectorial Approach

Let us assume that a sequence having or not having predetermined anharmonicities at certain orders and according to certain modes is to be given a first anharmonicity or an additional anharmonicity at an order $k$ according to a mode $p$, the order $k$ being higher than the higher anharmonicity order it already may present. The starting sequence is vectorially plotted on a first figure. One superimposes to this figure $(p-1)$ additional figures derived from the former by rotating the same through angles $$(a_1 + \frac{1}{p})\frac{2\pi}{k}$$

$$(a_2 + \frac{2}{p})\frac{2\pi}{k}$$

$$(a_{p-1} + \frac{p-1}{p})\frac{2\pi}{k}$$

where $a_1, a_2, \ldots a_{p-1}$ are integers.

The figure resulting from these superimpositions represents the searched sequence.

According to the invention, the means for generating a N-bit sequence anharmonic at orders $k_1, K_2 \ldots K_m$ according to modes $p_1, p_2, \ldots p_m$ starting from a binary sequence of N' bits anharmonic at orders $k_1, k_2, \ldots k_{m-1}$ according to modes $p_1, p_2 \ldots p_{m-1}$ comprises:

i. means to compute the permissible modes $p_m$ for the sequence to be generated according to the following exclusion rule:

$$\sum_{i=1}^{i=m} \frac{r_i}{k p_i} \neq 0$$

$r_i$ being an integer within the interval $)-p_i, +p_i($ ii. means for determining the number N of bits of the searched sequence given by the relationship $$N = LCM(N', k_m p_m)$$

where $LCM$ = less common multiple.

iii. means for deriving from the N'-bit sequence an intermediary sequence by replacing in the N'-bit sequence any bit one by a bit one followed by $[(N/N')-1]$ bits zero and any bit zero by $(N/N')$ zeros.

iv. means for successively shifting the intermediary sequence by $N/k_m p_m$ bits and means for adding $p_m$ so shifted sequences.

Synthesis of Anharmonic Sequences by Polynomial Approach

The polynomial associated to a sequence derived from a starting sequence and anharmonic at order $k$ according to mode $p$ is equal to the product of the polynomial associated to the starting sequence by the polynomial $$1 + \sum_{i=1}^{p-1} X^{(\beta_i + i/p)(N/k)} \quad (8)$$

where the $\beta_i$ coefficients are integers and $N = LCM(N', kp)$.

BRIEF DESCRIPTION OF THE DRAWINGS

The invention will be more fully appreciated from the following detailed description when considered in connection with the accompanying drawings in which.

DETAILED DESCRIPTION

Vectorial Synthesis

First Example (30-bit sequence)

Figure 1A:
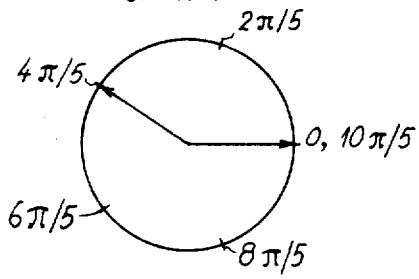
FIGS. 1a to 1e, 2a and 2b, 3a and 3b are circle diagram representations of binary sequences and have already been explained in the introductory part of the specification.
Figure 1B:
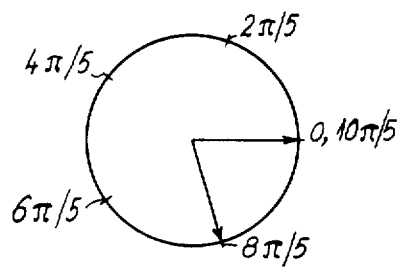
Figure 1C:
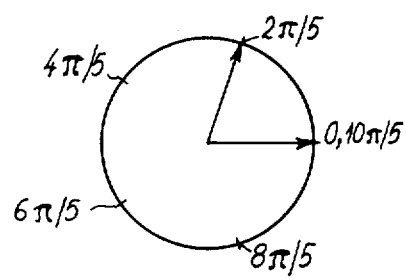
Figure 1D:
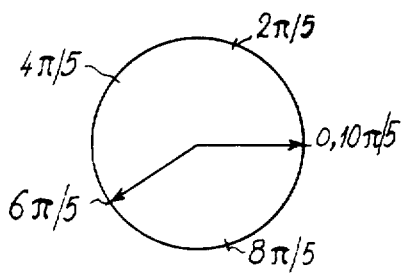
Figure 1E:
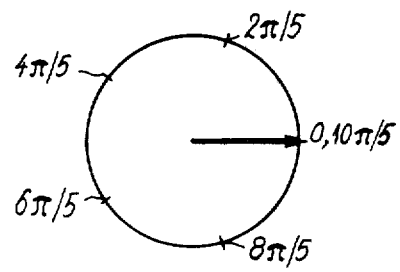
Figure 2A:
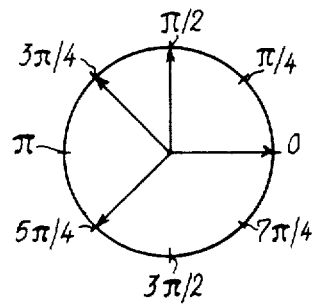
Figure 2B:
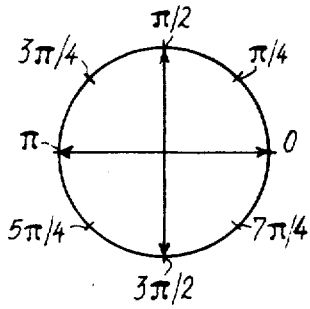
Figure 3A:
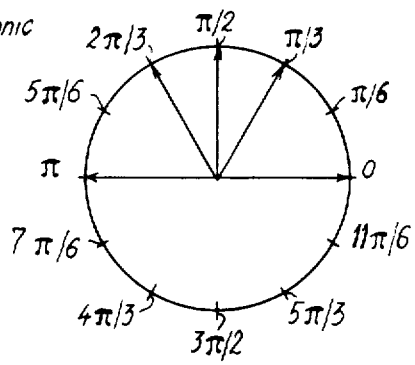
Figure 3B:
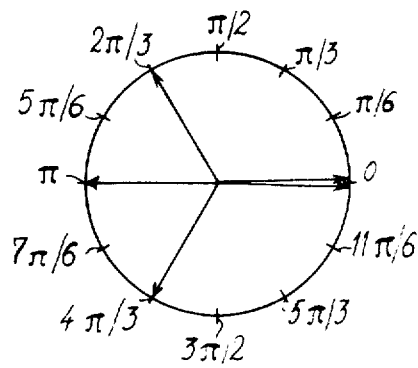
Figure 4A:
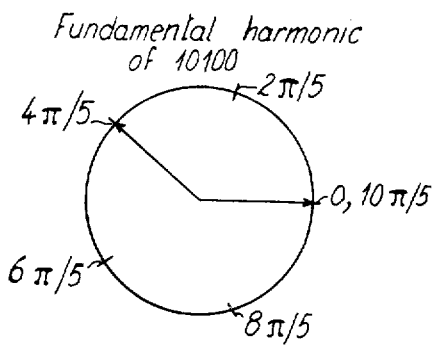
FIGS. 4a to 4c represent a first example of vectorial synthesis relative to a 30-bit sequence.
Figure 4B:
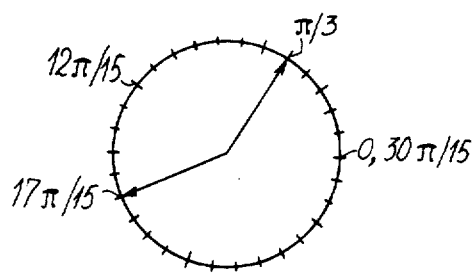
Figure 4C:
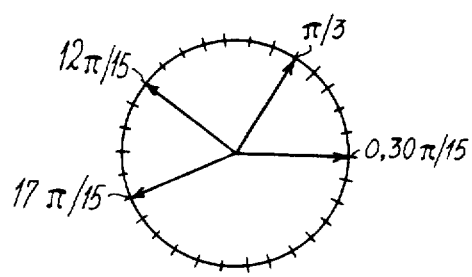

Let us take again as starting sequence, the sequence $$1\ 0\ 1\ 0\ 0 \quad (N' = 5) \quad (2)$$

which is represented in FIG. 4a identical to FIG. 1a and let us search a sequence derived from the preceding one and anharmonic at order 3 according to mode 2. The vectorial pattern of FIG. 4a is allowed to rotate by an angle $$\frac{1}{p} \times \frac{2\pi}{k} = \frac{1}{2} \times \frac{2\pi}{3} = \pi/3$$

which gives FIG. 4b with two vectors having respective arguments of $\pi/3$ and $(4\pi/5) + (\pi/3) = 17\pi/15$. The resulting sequence has $$N = LCM(N', kp) = LCM(5, 3 \times 2) = 30 \text{ bits}$$

and is represented in FIG. 4c which is the superimposition of FIGS. 4a and 4b. It reads $$1\ 0\ 0\ 0\ 0\ 1\ 0\ 0\ 0\ 0\ 0\ 0\ 1\ 0\ 0\ 0\ 1\ 0\ 0\ 0\ 0\ 0\ 0\ 0\ 0\ 0\ 0\ 0\ 0\ (N = 30)$$

Second Example (12-bit sequence)

Synthesis of a 12-bit sequence anharmonic at orders 2 and 3 according to mode 2. Thus $k_1 = 2; k_2 = 3; p_1 = 2; p_2 = 2$.

Figure 5A:
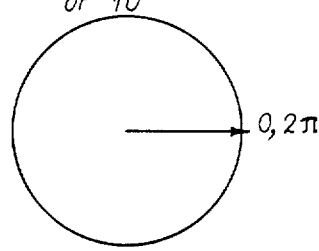
FIGS. 5a to 5g represent two other examples of vectorial synthesis respectively relative to a 12-bit sequence and a 24-bit sequence.

Let us take as starting sequence (see FIG. 5a)

$$1\ 0 \quad (N' = 2) \quad (5)$$

Figure 5B:
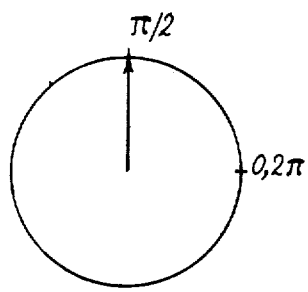
Figure 5C:
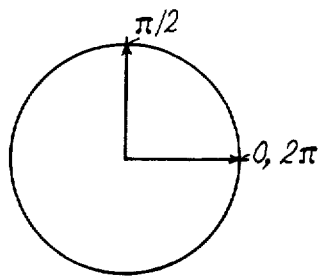
Figure 5D:
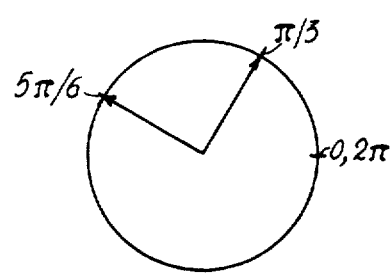

One superimposes to FIG. 5a, FIG. 5b derived from FIG. 5a, through a rotation of $$\frac{1}{p_1} \frac{2\pi}{k_1} = \frac{1}{2} \frac{2\pi}{2} = \pi/2$$

which gives FIG. 5c and one superimposes to FIG. 5c, FIG. 5d derived from FIG. 5c, through a rotation of $$\frac{1}{p_2} \frac{2\pi}{k_2} = \frac{1}{2} \frac{2\pi}{3} = \pi/3$$

Figure 5E:
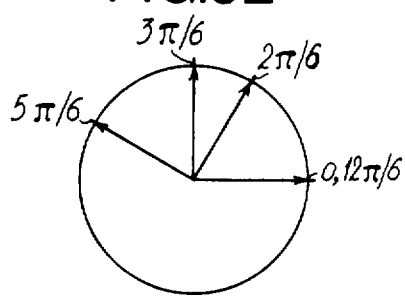

Superimposition of FIG. 5c and FIG. 5d gives FIG. 5e which represents the sequence $$1\ 0\ 1\ 1\ 0\ 1\ 0\ 0\ 0\ 0\ 0\ 0 \quad (6)$$

The found sequence has a number of bits equal to
$$N = LCM(N', k_1 p_1, k_2 p_2) = LCM(2, 4, 6) = 12$$

Third Example (24-bit sequence)

Synthesis of a 24-bit sequence anharmonic at orders 2, 3 and 4 according to mode 2.

Thus $k_1 = 2; k_2 = 3; k_3 = 4; p_1 = p_2 = p_3 = 2$. Let us take as starting sequence (see FIG. 5e)

$$1\ 0\ 1\ 1\ 0\ 1\ 0\ 0\ 0\ 0\ 0\ 0 \quad (N' = 12) \quad (6)$$

which is already anharmonic at orders 2 and 3 according to mode 2.

Figure 5F:
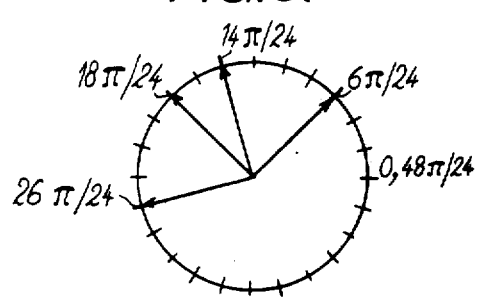
Figure 5G:
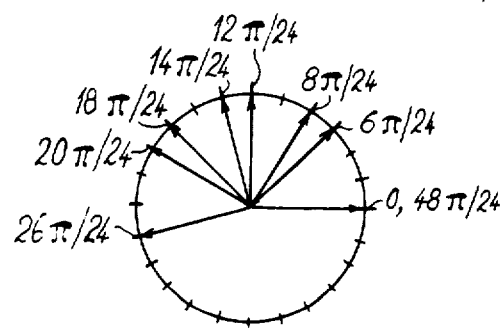

One superimposes to FIG. 5e, FIG. 5f derived from FIG. 5e through a rotation of $$\frac{1}{p_3} \frac{2\pi}{k_3} = \frac{1}{2} \frac{2\pi}{4} = \pi/4$$

which gives 5g. This latter figure represents the sequence $$1 0 0 1 1 0 1 1 0 1 1 0 0 1 0 0 0 0 0 0 0 0 0 0 \quad (N = 24) \qquad (7)$$

The number N is equal to $$N = LCM(N', k_3 p_3) = LCM(12,8) = 24$$

Fourth Example (24-bit sequence)

This example is the same as the third example starting sequence $$1 0 1 1 0 1 0 0 0 0 0 0 \qquad (6)$$

$$N' = 12 \quad k_3 = 4 \quad p_3 = 2$$

and it is treated according to the general process of the Vectorial Approach including steps (i) to (iv):

i. checking that $p_m = 2$ is permissible according to the exclusion rule $$r_i = -2, -1, +1, +2$$

$$\frac{r_1}{k_1 p_1} + \frac{r_2}{k_2 p_2} + \frac{r_3}{k_3 p_3} = \frac{r_1}{4} + \frac{r_2}{6} + \frac{r_3}{8} = \frac{1}{24}(6r_1 + 4r_2 + 3r_3)$$

There is not any set of r's values which can bring to zero the bracketed member of the second side of the previous equation;

ii. computing the number N of bits of the sought sequence $$N = LCM(N', k_3 p_3) = LCM(12,8) = 24$$

iii. replacing in sequence (7) any bit one by a bit one followed by $(N/N') - 1 = (24/12) - 1 = 1$ bit zero and any bit zero by $(N/N') = (24/12) = 2$ zeros, thus obtaining the intermediary sequence:

1 0 1 <u>1 0 1 0 0 0 0 0 0</u>
1 0 0 0 1 0 1 0 0 0 1 0 0 0 0 0 0 0 0 0 0 0 0 0 iv. successively shifting the intermediary sequence per $N/k_3 p_3 = 24/8 = 3$ bits and adding $p_3 = 2$ shifted intermediary sequences:

$$\begin{array}{l} 1 0 0 0 1 0 1 0 0 0 1 0 0 0 0 0 0 0 0 0 0 0 0 0 \\ 0 0 0 1 0 0 0 1 0 1 0 0 0 1 0 0 0 0 0 0 0 0 0 0 \\ \hline 1 0 0 1 1 0 1 1 0 1 1 0 0 1 0 0 0 0 0 0 0 0 0 0 \quad (N = 24) \end{array} \qquad (7)$$

Figure 7:
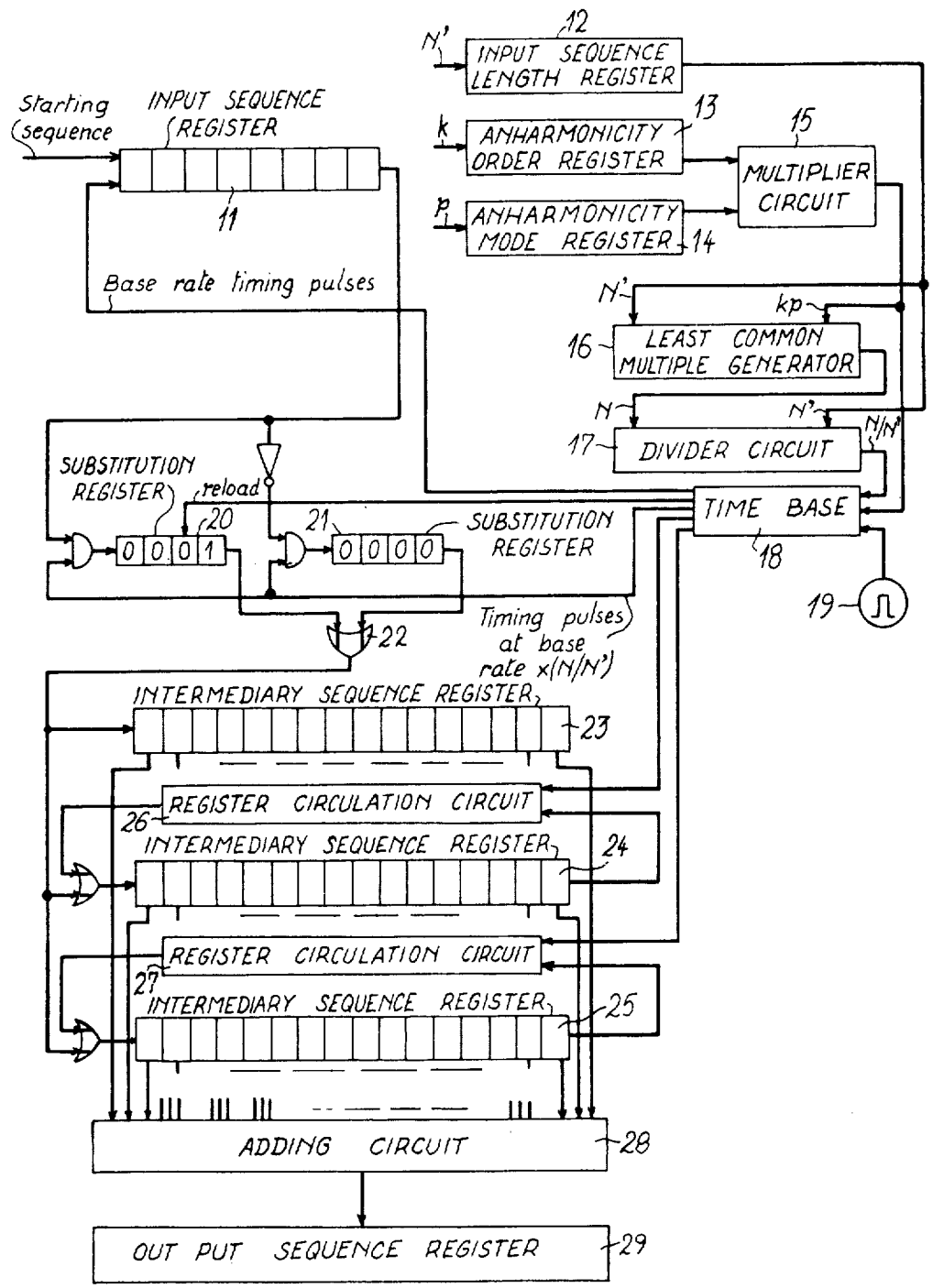
FIG. 7 represents in block diagram form a synthetizer for generating sine sequences by the vectorial approach.

Referring now to FIG. 7, 11 represents an input sequence register, 12 an input sequence length register, 13 an anharmonicity order register and 14 an anharmonicity mode register. The starting sequence is entered into register 11, the length N' of this starting sequence is entered into register 12, the anharmonicity order k is entered into register 13 and the anharmonicity mode p is entered into register 14.

Registers 13 and 14 are connected to a multiplier circuit 15 and register 12 and multiplier circuit 15 are connected to a least common multiple (LCM) generator 16. This LCM generator gives the number of bits N in the sequence to be generated. The numbers N and N' respectively provided by register 12 and LCM generator 16 are applied to a divider circuit 17 which supplies the ratio N/N'. This ratio is applied to a time base 18.

Time base 18 is driven by clock 19 and it is controlled by divider circuit 17 which sends it the signal N/N' and by multiplier circuit 15 which sends it the signal kp. Time base 18 sends timing pulses at a base rate to input sequence register 11 and timing pulses at a higher rate equal to N/N' times the base rate to substitution registers 20 and 21. One of these two registers is selectively activated by the outgoing digit from register 11 and it is stepped on by the higher rate timing pulses. Substitution register 20 contains a one in its first stage followed by zeros in its subsequent stages. Substitution register 21 contains zeros in all its stages. When substitution register 20 has output a one followed by [(N/N') − 1] zeros it is reloaded with a bit one in its first stage under the control of time base 18. Substitution registers 20 and 21 are connected through an OR-gate 22 to a plurality of intermediary sequence registers 23, 24, 25. Register 23 is an unlooped shift register and registers 24 and 25 are looped shift registers. Circulation in registers 24 and 25 is controlled by register circulation circuits 26 and 27 and these circuits are controlled by time base 18.

The contents of intermediary sequence registers 23, 24, 25 are added in adding circuit 28 and the sum is registered in output sequence register 29. This sum is the sought anharmonic sequence.

Polynomial Synthesis

First Example (30-bit sequence)

It is the same example as the first example of the Vectorial Synthesis.

$$\begin{array}{l} \text{Starting sequence} \\ 1 0 1 0 0 \qquad (N' = 5) \\ k = 3 \qquad p = 2 \\ N = LCM(5,6) = 30 \end{array} \qquad (2)$$

Polynomial associated with the starting sequence (the variable is $x^{N/N'} = x^6$):

$$1 + x^{12}$$

Polynomial associated with the searched anharmonic sequence $$P = (1 + x^{12}) \times \left[ \sum_{i=0}^{i=p-1} x^{iN/k_p} \right]$$

$$P = (1 + x^{12})(1 + x^5) = 1 + x^5 + x^{12} + x^{17} \qquad (9)$$

The anharmonic sequence is:

1 0 0 0 0 1 0 0 0 0 0 0 1 0 0 0 1 0 0 0 0 0 0 0 0 0 0 0 0 0 ($N=30$)

Second Example (12-bit sequence)

It is the same example as the second example of the Vectorial Synthesis.

Starting sequence 1 0      $(N' = 2)$      (5)
$$k_1 = 2 \; k_2 = 3 \; p_1 = p_2 = 2$$
$$N = LCM\,(2, 4, 6) = 12$$

Polynomial associated with the starting sequence $x^o$

Polynomial associated with the searched anharmonic sequence $$P = \left[ \sum_{i=0}^{p_1 - 1} x^{iN/k_1 p_1} \right] \times \left[ \sum_{i'=0}^{p_2 - 1} x^{i'N/k_2 p_2} \right] \quad (10)$$

$$P = (1 + x^3)(1 + x^2) = 1 + x^2 + x^3 + x^5 \quad (10)$$

The anharmonic sequence is:

1 0 1 1 0 1 0 0 0 0 0 0      (6)

Third Example (24-bit sequence)

It is the same example as the third example of the Vectorial Synthesis.

1 0 1 1 0 1 0 0 0 0 0 0      $(N' = 12)$      (6)
$$k_1 = 2 \,;\, k_2 = 3 \,;\, k_3 = 4 \,;\, p_1 = p_2 = p_3 = 2$$
$$N = LCM\,(12, 2 \times 4) = 24$$

Polynomial associated with the starting sequence (the variable is $x^{N/N'} = x^2$):

$$1 + x^4 + x^6 + x^{10}$$

Polynomial associated with the searched anharmonic sequence $$P = (1 + x^4 + x^6 + x^{10}) \times \left[ \sum_{i=0}^{i = p_3 - 1} x^{iN/k_3 p_3} \right]$$

$$P = (1 + x^4 + x^6 + x^{10})(1 + x^3)$$

$$P = 1 + x^3 + x^4 + x^6 + x^7 + x^9 + x^{10} + x^{13} \quad (11)$$

The anharmonic sequence is:

1 0 0 1 1 0 1 1 0 1 1 0 0 1 0 0 0 0 0 0 0 0 0 0 (N=24)      (7)

Cyclotomic Polynomial of an Anharmonic Sequence

The polynomial $$\sum_{i=0}^{p-1} x^{iN/kp}$$

by which the polynomial associated with the starting sequence is to be multiplied for obtaining the polynomial associated with the anharmonic sequence is nothing else than the so-called cyclotomic polynomial $$Q^{(p)}(x^{N/kp}) = (1 + x^{N/k}) / (1 + x^{N/kp})$$

The cyclotomic polynomials are defined and their properties are proved in "Algebraic Coding Theory" by Elwin R. BERLEKAMP, McGraw-Hill Book Company, pages 90–95.

The polynomial associated with a sequence anharmonic at orders $k_m$ according to modes $p_m$ can be written $$\pi_m \, Q^{(p_m)}(x^{N/k_m p_m})$$

with $$N = LCM\,(k_m p_m)$$

Definition of the Characteristic Polynomial Associated with a Sequence

Let us consider a sequence $s_i$ of N bits and its associated polynomial $$P = \sum_{i=0}^{N-1} s_i X^i$$

The associated polynomial remains the same disregarding the circular permutations applied to the sequence. Writing the last term of the sequence as the first term thereof, one finds:

$$P \rightarrow XP + s_{N-1}(X^N + 1) \quad (12)$$

Let us call characteristic polynomial CP of the sequence, the polynomial $$CP = \frac{1 + X^N}{GCD(1 + X^N, P)} \quad (13)$$

and initialization polynomial IP of the sequence the polynomial $$IP = \frac{P}{GCD(1 + X^N, P)} \quad (14)$$

GCD = greatest common divisor.

Circular permutation relationship (12) gives:

$$IP \rightarrow X(IP) + s_{N-1}(CP) \quad (15)$$

Relationship (15) shows that the coefficient $s_i$ of polynomial P can be obtained by means of a shift register looped by exclusive OR-gates according to the characteristic polynomial and initialized by the initialization polynomial First Example (30-bit sequence)

Polynomial associated with the sequence:

$$P = 1 + X^5 + X^{12} + X^{17} \quad (9)$$

Let us factor the polynomial P and the polynomial $1 + X^N = 1 + X^{30}$. Keeping in mind that these polynominals are defined over a two-element Galois field, this gives:

$$P = (1 + X)^5 \times (1 + X + X^2)^4 \times (1 + X + X^2 + X^3 + X^4) \quad (16)$$

$$1 + X^{30} = (1 + X^{15})^2 = (1 + X)^2 \times (1 + X + X^2 + X^3 + X^4)^2$$

-continued
$$\times (1 + X + X^2)^2 \times (1 + X + X^3 + X^4 + X^5 + X^7 + X^8)^2$$
$$GCD(1 + X^{30}, P) = (1 + X)^2 \times (1 + X + X^2 + X^3 + X^4) \times (1 + X + X^2)^2$$
$$CP = (1 + X + X^2 + X^3 + X^4) \times (1 + X + X^3 + X^4 + X^5 + X^7 + X^8)^2$$
$$= 1 + X + X^5 + X^7 + X^{10} + X^{13} + X^{15} + X^{19} + X^{20}$$

$$CP = 110001010010010100011 \tag{16}$$

$$IP = (1 + X)^3 \times (1 + X + X^2)^2 = 1 + X + X^6 + X^7$$

$$IP = 11000011000000000000 \tag{17}$$

Second Example (12-bit sequence)
Polynomial associated with the sequence:

$$P = 1 + X^2 + X^3 + X^5 \tag{10}$$

Let us factor the polynomial P and the polynomial $1 + X^N = 1 + X^{12}$. This gives:

$$P = (1 + X)^3 (1 + X + X^2)$$

$$1 + X^{12} = (1 + X^6)^2 = (1 + X^3)^4 = (1 + X)^4 (1 + X + X^2)^4$$

$$GCD(1 + X^{12}, P) = (1 + X)^3 (1 + X + X^2)$$

In this case GCD $(1 + X^{12}, P) = P$ $$CP = \frac{(1 + X)^4 (1 + X + X^2)^4}{(1 + X)^3 (1 + X + X^2)} = (1 + X)(1 + X + X^2)^3 = 1 + X^2 + X^3 + X^4 + X^5 + X^7$$

$$CP = 10111101$$

$$IP = P/P = 10000000 \tag{19}$$

Third Example (24-bit sequence)
Polynomial associated with the sequence:

$$P = 1 + X^3 + X^4 + X^6 + X^7 + X^9 + X^{10} + X^{13} \tag{11}$$

Let us factor the polynomial P and the polynomial $1 + X^N = 1 + X_{24}$. This gives:

$$P = (1 + X)^7 (1 + X + X^2)^3$$
$$1 + X^{24} = (1 + X^{12})^2 = (1 + X)^8 (1 + X + X^2)^8$$
$$GCD(1 + X^{24}, P) = (1 + X)^7 (1 + X + X^2)^3$$

$$CP = \frac{(1 + X)^8 (1 + X + X^2)^8}{(1 + X)^7 (1 + X + X^2)^3} = (1 + X)(1 + X + X^2)^5$$

$$CP = 1 + X^3 + X^4 + X^7 + X^8 + X^{11}$$
$$CP = 100110011001 \tag{20}$$

$$IP = \frac{(1 + X)^7 (1 + X + X^2)^3}{(1 + X)^7 (1 + X + X^2)^3}$$

$$IP = P/P = 100000000000 \tag{21}$$

Figure 16:
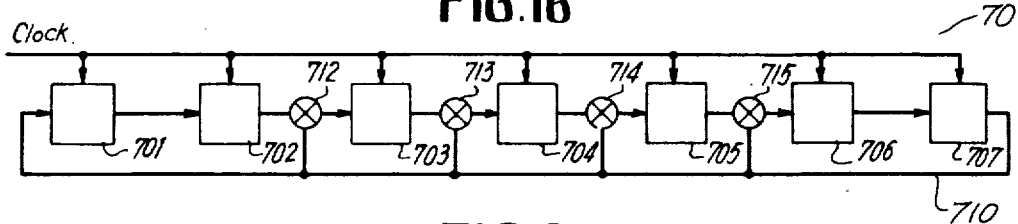
FIG. 16 represents an anharmonic sequence generator formed of a shift register presenting exclusive OR-gate loops, the looping pattern depending on the characteristic polynomials of the sequences.

Referring now to FIG. 16, 70 is a shift register receiving from a clock steeping-on pulses and from an initialization register (not represented) an initialization sequence. This shift register has seven stages 701–707, some of which are connected to the following stage through an exclusive OR-gate, namely 712, 713, 714, 715. The output of stage 707 is looped to the input of stage 701 by lead 710. Lead 710 is connected to the second input of OR-gates 712–715. It appears to those skilled in Algebraic Coding Theory that shift register 70 is associated to characteristic polynomial (18) and, if it is initialized by polynomial (19), it will generate polynomial (10).

To make clear how the shift register is formed depending on the characteristic polynomial, let us describe the shift register associated to characteristic polynomial (20). It will comprise 11 stages and exclusive OR-gates between the third and fourth, the fourth and fifth, the seventh and eighth, the eighth and ninth stages.

With reference to FIGS. 9–12, we shall explain how to derive a shift register assembly from the polynomial associated to the sequence and not from the characteristic polynomial.

Figure 9:
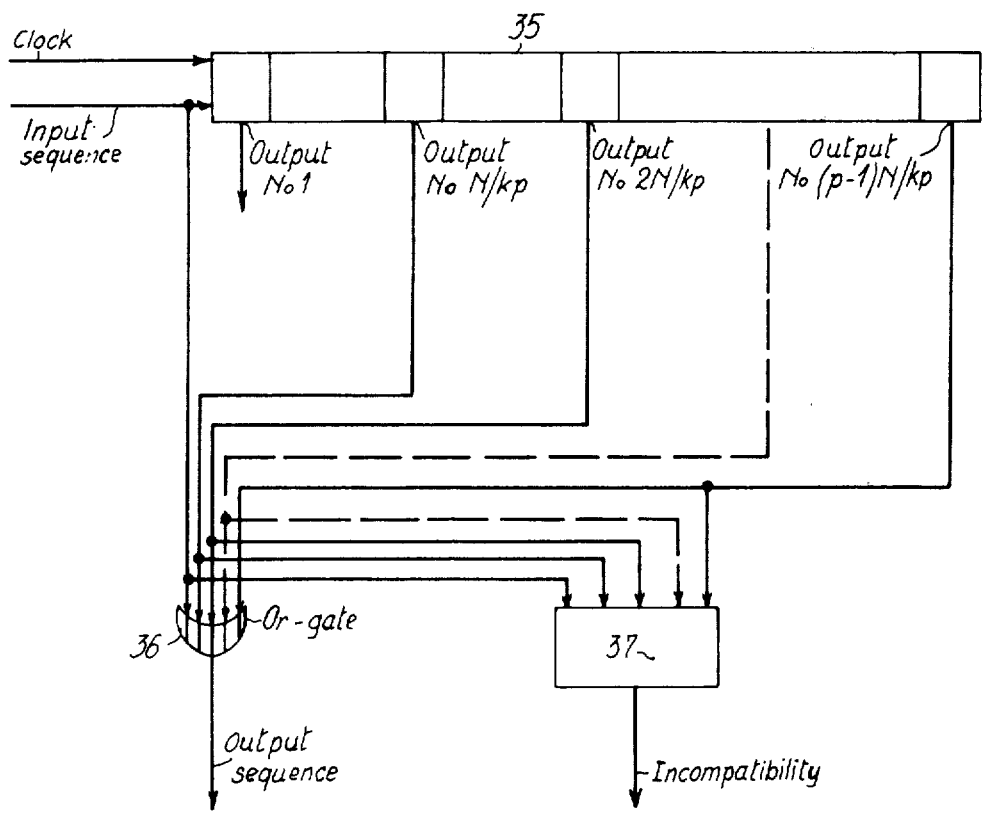
FIGS. 9 to 12 represent anharmonic sequence generators formed of shift registers presenting exclusive OR-gate loops, the looping pattern depending on the polynomials associated with the sequences.

FIG. 9 is relative to a sequence with a pair "order-mode" only.

A N-bit sequence is entered into a shift register 35 (FIG. 9) having $(p-1)N/kp$ stages and one output and $(p-2)$ intermediary outputs. The outputs are spaced apart every group of N/kp stages. The input and the $(p-1)$ outputs are connected to an OR-gate 36 at the output of which the sought sequence is produced. The input and outputs of shift register 35 are also connected to a circuit 37 which counts the number of its input terminals which are simultaneously brought to the one level. If at least two terminals carry a one, the exclusive rule is not complied with and the sought sequence cannot be found.

Figure 10:
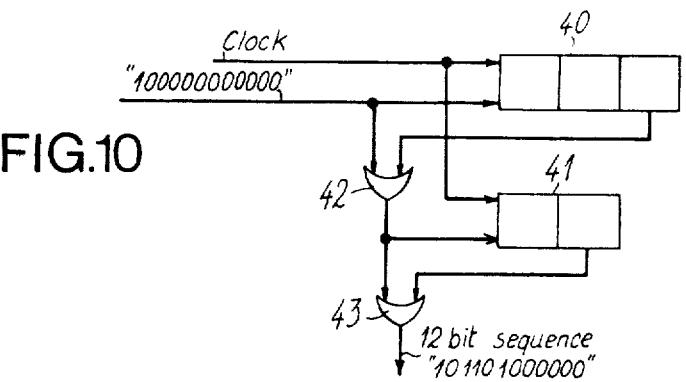

FIG. 10 is an application of FIG. 9 to the 12-bit sequence which has two pairs "order-mode":

| $k_1 = 2$ | $p_1 = 2$ | $N/k_1 p_1 = 3$ |
|---|---|---|
| $k_2 = 3$ | $p_2 = 2$ | $N/k_2 p_2 = 2$ |

The sequence generator comprises a first shift register 40 with $(p_1-1)N/k_1 p_1 = 3$ stages and a second shift register 41 with $(p_2-1)N/k_2 p_2 = 2$ stages. The input and the output of shift register 40 are connected to exclusive OR-gate 42 and the output of said OR-gate is connected to the input of shift register 41. The input and the output of shift register 41 are connected to exclusive OR-gate 43 and, at the output of said OR-gate, the 12-bit sought anharmonic sequence if found.

Figure 11:
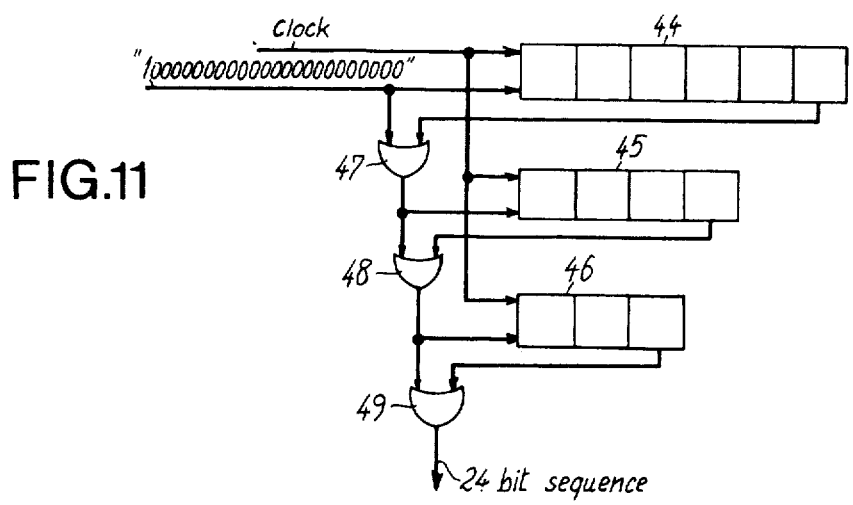

FIG. 11 is an application of FIG. 9 to the 24-bit sequence which has three pairs "order-mode":

| $k_1 = 2$ | $p_1 = 2$ | $N/k_1 p_1 = 6$ |
|---|---|---|
| $k_2 = 3$ | $p_2 = 2$ | $N/k_2 p_2 = 4$ |
| $k_3 = 4$ | $p_3 = 2$ | $N/k_3 p_3 = 3$ |

The sequence generator comprises a first shift register 44 with $(p_1-1)N/k_1p_1 = 6$ stages, a second shift register 45 with $(p_2-1)N/k_2p_2 = 4$ stages and a third shift register 46 with $(p_3-1)N/k_3p_3 = 3$ stages. The input and the output of shift register 44 are connected to exclusive OR-gate 47 and the output of the same is connected to shift register 45. The input and output of shift register 45 are connected to exclusive OR-gate 48 and the output of the same of connected to shift register 46. The input and output of shift register 46 are connected to exclusive OR-gate 49 and at the output of said OR-gate the 24-bit sought anharmonic sequence is found.

Figure 12:
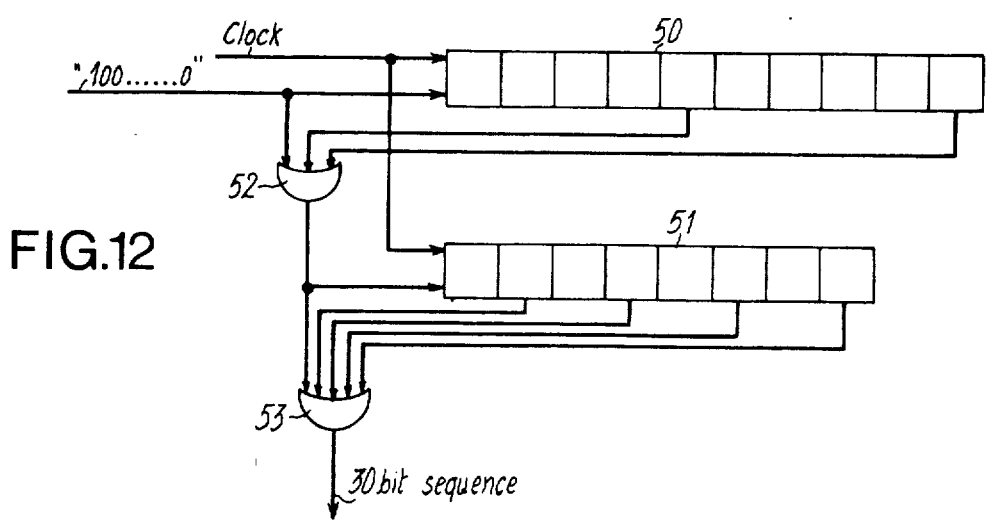

FIG. 12 is an application of FIG. 9 to a 30-bit sequence. This sequence is not that already considered in the foregoing but it is the sequence which is tabulated in table 5. It has two pairs "order-mode":

| $k_1 = 2$ | $p_1 = 3$ | $N/k_1p_1 = 5$ |
|---|---|---|
| $k_2 = 3$ | $p_2 = 5$ | $N/k_2p_2 = 2$ |

Shift register 50 has 10 stages and two outputs. Shift register 51 has eight stages and four outputs. The input and the two outputs of shift register 50 are connected to exclusive OR-gate 52. The output of this OR-gate is connected to shift register 51. The input and the four outputs of shift register 51 are connected to exclusive OR-gate 53. At the output of said OR-gate the 30-bit sought anharmonic sequence is found.

Now, the principal anharmonic sequences of at most 1050 bits will be given in tables Nos. 1-19. Each table gives the modulus in linear fraction and in decibels of the nonzero harmonics of the sequence. A recapitulory table gives, for each sequence, its length, the first nonzero harmonic, the orders and the modes, and a reference to the sequence table in which it is tabulated.

All the sequences listed in the tables are even sequences which present particular properties.

Figure 6A:
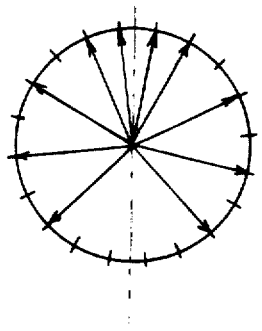
FIGS. 6a and 6b are circle diagrams for proving the properties of even sequences.
Figure 6B:
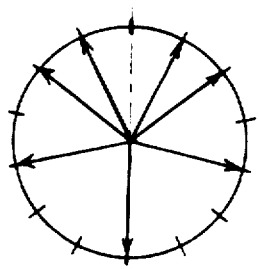

Even Sequences (FIGS. 6a and 6b)

An even sequence is a sequence whose circle diagram corresponding to the fundamental harmonic S(F) has a diameter as symmetry axis and the center of the circle as antisymmetry center. I results that the even sequences have as many zero bits as one bits.

The even sequences are anharmonic at all the even orders. The product of the modes of anharmonicity of an even sequence is equal to half its number of bits:

$$P_1 P_2 P_3 \ldots P_m = N/2$$

Figure 8:
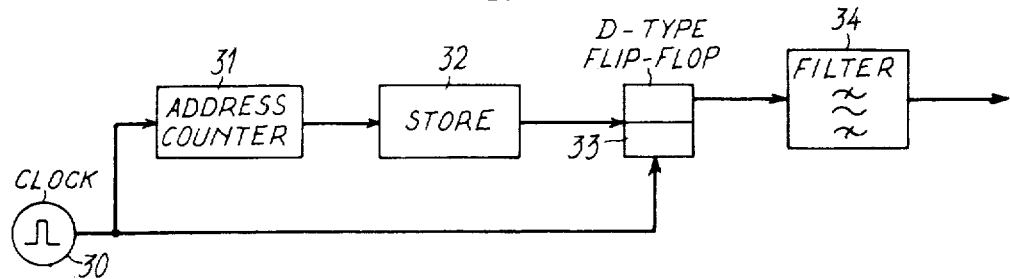
FIG. 8 represents an anharmonic sequence generator in which the bits of the sequence are contained at successive addresses in a read only memory.

Referring now to FIG. 8, a generator of anharmonic sequences comprises a clock 30, an address counter 31 counting up to the number N of bits of the sequence and a read only store 32 containing at the addresses given by counter 31 the bits of the sequence. The output of store 32 is connected to a type-D flip-flop 33 controlled by the clock and which serves for stepping on the bits supplied by the store. If the sine sequence is to be converted into an analog sine signal, a low-pass filter 34 is connected to flip flop 33.

TABLE 1

SEQUENCE OF 12 BITS 1 0 1 1 0 1 0 0 0 0 0 0

| FREQUENCY | MODULUS | MODULUS(DB) |
|---|---|---|
| 1.00 | 0.2018 | 0. DB |
| *** 2.00 | 0.0000 | |
| *** 3.00 | 0.0000 | |
| 4.00 | 0.1378 | −3. DB |

TABLE 1-continued

SEQUENCE OF 12 BITS 1 0 1 1 0 1 0 0 0 0 0 0

| FREQUENCY | MODULUS | MODULUS(DB) |
|---|---|---|
| 5.00 | 0.1506 | −3. DB |
| *** 6.00 | 0.0000 | |
| 7.00 | 0.1076 | −5. DB |
| 8.00 | 0.0689 | −9. DB |
| *** 9.00 | 0.0000 | |
| *** 10.00 | 0.0000 | |
| 11.00 | 0.0183 | −21. DB |
| *** 12.00 | 0.0000 | |
| 13.00 | 0.0155 | −22. DB |
| *** 15.00 | 0.0000 | |

TABLE 2

SEQUENCE OF 18 BITS 1 0 0 1 0 1 0 1 1 0 1 1 0 1 0 1 0 0

| FREQUENCY | MODULUS | MODULUS (DB) |
|---|---|---|
| 1.00 | 0.0972 | 0. DB |
| *** 2.00 | 0.0000 | ....... |
| *** 3.00 | 0.0000 | ....... |
| *** 4.00 | 0.0000 | ....... |
| 5.00 | 0.1314 | 3. DB |
| *** 6.00 | 0.0000 | ....... |
| 7.00 | 0.2164 | 7. DB |
| *** 8.00 | 0.0000 | ....... |
| 9.00 | 0.1061 | 1. DB |
| *** 10.00 | 0.0000 | ....... |
| 11.00 | 0.1377 | 3. DB |
| *** 12.00 | 0.0000 | ....... |
| 13.00 | 0.0505 | −6. DB |
| *** 14.00 | 0.0000 | ....... |
| *** 15.00 | 0.0000 | ....... |
| *** 16.00 | 0.0000 | ....... |
| 17.00 | 0.0057 | −25. DB |
| *** 18.00 | 0.0000 | ....... |
| 19.00 | 0.0051 | −26. DB |
| *** 20.00 | 0.0000 | ....... |
| *** 21.00 | 0.0000 | ....... |
| *** 22.00 | 0.0000 | ....... |
| 23.00 | 0.0286 | −11. DB |
| *** 24.00 | 0.0000 | ....... |
| 25.00 | 0.0606 | −4. DB |
| *** 26.00 | 0.0000 | ....... |
| 27.00 | 0.0354 | −9. DB |
| *** 28.00 | 0.0000 | ....... |
| 29.00 | 0.0522 | −5. DB |
| *** 30.00 | 0.0000 | ....... |
| 31.00 | 0.0212 | −13. DB |

SEQUENCE OF 18 BITS 0 0 0 1 0 1 1 1 1 1 1 0 1 0 0 0 0

| FREQUENCY | MODULUS | MODULUS(DB) |
|---|---|---|
| 1.00 | 0.2799 | 0. DB |
| *** 2.00 | 0.0000 | ....... |
| *** 3.00 | 0.0000 | ....... |
| *** 4.00 | 0.0000 | ....... |
| 5.00 | 0.0858 | −10. DB |
| *** 6.00 | 0.0000 | ....... |
| 7.00 | 0.1151 | −8. DB |
| *** 8.00 | 0.0000 | ....... |
| 9.00 | 0.1061 | −8. DB |
| *** 10.00 | 0.0000 | ....... |
| 11.00 | 0.0733 | −12. DB |
| *** 12.00 | 0.0000 | ....... |
| 13.00 | 0.0330 | −19. DB |
| *** 15.00 | 0.0000 | ....... |

TABLE 4

SEQUENCE OF 24 BITS 0 1 1 0 1 1 0 1 1 0 0 1 0 0 0 0 0 0 0 0 0 0 1 0

| FREQUENCY | MODULUS | MODULUS(DB) |
|---|---|---|
| 1.00 | 0.1880 | 0. DB |
| *** 2.00 | 0.0000 | ....... |
| *** 3.00 | 0.0000 | ....... |
| *** 4.00 | 0.0000 | ....... |
| 5.00 | 0.0727 | −8. DB |
| *** 6.00 | 0.0000 | ....... |
| 7.00 | 0.1633 | −1. DB |
| 8.00 | 0.1378 | −3. DB |

TABLE 4-continued
SEQUENCE OF 24 BITS
011011011001000000000010

| FREQUENCY | MODULUS | MODULUS(DB) |
|---|---|---|
| *** 9.00 | 0.0000 | ....... |
| *** 10.00 | 0.0000 | ....... |
| 11.00 | 0.0538 | −11. DB |
| 13.00 | 0.0455 | −12. DB |
| *** 14.00 | 0.0000 | ....... |
| *** 15.00 | 0.0000 | ....... |
| 16.00 | 0.0689 | −9. DB |
| 17.00 | 0.0672 | −9. DB |
| *** 18.00 | 0.0000 | ....... |
| 19.00 | 0.0191 | −20. DB |
| *** 20.00 | 0.0000 | ....... |
| *** 21.00 | 0.0000 | ....... |
| *** 22.00 | 0.0000 | ....... |
| 23.00 | 0.0012 | −27. DB |
| *** 24.00 | 0.0000 | ....... |
| 25.00 | 0.0075 | −28. DB |
| *** 26.00 | 0.0000 | ....... |
| *** 27.00 | 0.0000 | ....... |
| *** 28.00 | 0.0000 | ....... |
| 29.00 | 0.0125 | −24. DB |
| *** 30.00 | 0.0000 | ....... |
| 31.00 | 0.0369 | −18. DB |

TABLE 5
SEQUENCE OF 30 BITS
000001010111111111110101000000

| FREQUENCY | MODULUS | MODULUS(DB) |
|---|---|---|
| 1.00 | 0.2772 | 0. DB |
| *** 2.00 | 0.0000 | ....... |
| *** 3.00 | 0.0000 | ....... |
| *** 4.00 | 0.0000 | ....... |
| 5.00 | 0.0637 | −13. DB |
| *** 6.00 | 0.0000 | ....... |
| 7.00 | 0.0530 | −14. DB |
| *** 8.00 | 0.0000 | ....... |
| *** 9.00 | 0.0000 | ....... |
| *** 10.00 | 0.0000 | ....... |
| 11.00 | 0.0616 | −13. DB |
| *** 12.00 | 0.0000 | ....... |
| 13.00 | 0.1020 | −9. DB |
| *** 14.00 | 0.0000 | ....... |
| 15.00 | 0.1061 | −8. DB |

TABLE 6
SEQUENCE OF 42 BITS
000000010101011111111111111101010
10000000

| FREQUENCY | MODULUS | MODULUS(DB) |
|---|---|---|
| 1.00 | 0.2764 | 0. DB |
| *** 2.00 | 0.0000 | ....... |
| *** 3.00 | 0.0000 | ....... |
| *** 4.00 | 0.0000 | ....... |
| 5.00 | 0.0592 | −13. DB |
| *** 6.00 | 0.0000 | ....... |
| 7.00 | 0.0455 | −16. DB |
| *** 8.00 | 0.0000 | ....... |
| *** 9.00 | 0.0000 | ....... |
| *** 10.00 | 0.0000 | ....... |
| 11.00 | 0.0368 | −18. DB |
| *** 12.00 | 0.0000 | ....... |
| 13.00 | 0.0376 | −17. DB |
| *** 14.00 | 0.0000 | ....... |
| *** 15.00 | 0.0000 | ....... |
| *** 16.00 | 0.0000 | ....... |
| 17.00 | 0.0550 | −14. DB |
| *** 18.00 | 0.0000 | ....... |
| 19.00 | 0.0973 | −9. DB |
| *** 20.00 | 0.0000 | ....... |
| 21.00 | 0.1061 | −8. DB |
| *** 22.00 | 0.0000 | ....... |
| 23.00 | 0.0804 | −11. DB |
| *** 24.00 | 0.0000 | ....... |
| 25.00 | 0.0374 | −17. DB |
| *** 26.00 | 0.0000 | ....... |
| *** 27.00 | 0.0000 | ....... |
| *** 28.00 | 0.0000 | ....... |
| 29.00 | 0.0169 | −24. DB |
| *** 30.00 | 0.0000 | ....... |
| 31.00 | 0.0131 | −27. DB |
| *** 32.00 | 0.0000 | ....... |
| *** 33.00 | 0.0000 | ....... |
| *** 34.00 | 0.0000 | ....... |

TABLE 6-continued
SEQUENCE OF 42 BITS
000000010101011111111111111101010
10000000

| FREQUENCY | MODULUS | MODULUS(DB) |
|---|---|---|
| 35.00 | 0.0091 | −30. DB |
| *** 36.00 | 0.0000 | ....... |
| 37.00 | 0.0080 | −31. DB |
| *** 38.00 | 0.0000 | ....... |
| *** 39.00 | 0.0000 | ....... |

TABLE 7
SEQUENCE OF 66 BITS
00000000000101010101011111111111
1111111111101010101000000000000

| FREQUENCY | MODULUS | MODULUS(DB) |
|---|---|---|
| 1.00 | 0.2760 | 0. DB |
| *** 2.00 | 0.0000 | ....... |
| *** 3.00 | 0.0000 | ....... |
| *** 4.00 | 0.0000 | ....... |
| 5.00 | 0.0567 | −14. DB |
| *** 6.00 | 0.0000 | ....... |
| 7.00 | 0.0417 | −16. DB |
| *** 8.00 | 0.0000 | ....... |
| *** 9.00 | 0.0000 | ....... |
| *** 10.00 | 0.0000 | ....... |
| 11.00 | 0.0289 | −20. DB |
| *** 12.00 | 0.000 | ....... |
| 13.00 | 0.0260 | −21. DB |
| *** 14.00 | 0.0000 | ....... |
| *** 15.00 | 0.0000 | ....... |
| *** 16.00 | 0.0000 | ....... |
| 17.00 | 0.0235 | −21. DB |
| *** 18.00 | 0.0000 | ....... |
| 19.00 | 0.0235 | −21. DB |
| *** 20.00 | 0.0000 | ....... |
| *** 21.00 | 0.0000 | ....... |
| *** 22.00 | 0.0000 | ....... |
| 23.00 | 0.0262 | −20. DB |
| *** 24.00 | 0.0000 | ....... |
| 25.00 | 0.0297 | −19. DB |
| *** 26.00 | 0.0000 | ....... |
| *** 27.00 | 0.0000 | ....... |
| *** 28.00 | 0.0000 | ....... |
| 29.00 | 0.0502 | −15. DB |
| *** 30.00 | 0.0000 | ....... |
| 31.00 | 0.0935 | −9. DB |
| *** 32.00 | 0.0000 | ....... |
| 33.00 | 0.1061 | −8. DB |
| *** 34.00 | 0.0000 | ....... |
| 35.00 | 0.0829 | −10. DB |
| *** 36.00 | 0.0000 | ....... |
| 37.00 | 0.0394 | −17. DB |
| *** 38.00 | 0.0000 | ....... |
| *** 39.00 | 0.0000 | ....... |

TABLE 8
SEQUENCE OF 78 BITS
000000000000101010101010111111111
11111111111111110101010101010000000
00000000

| FREQUENCY | MODULUS | MODULUS(DB) |
|---|---|---|
| 1.00 | 0.2759 | 0. DB |
| *** 2.00 | 0.0000 | ....... |
| *** 3.00 | 0.0000 | ....... |
| *** 4.00 | 0.0000 | ....... |
| 5.00 | 0.0563 | −14. DB |
| *** 6.00 | 0.0000 | ....... |
| 7.00 | 0.0410 | −17. DB |
| *** 8.00 | 0.0000 | ....... |
| *** 9.00 | 0.0000 | ....... |
| *** 10.00 | 0.0000 | ....... |
| 11.00 | 0.0277 | −20. DB |
| *** 12.00 | 0.0000 | ....... |
| 13.00 | 0.0245 | −21. DB |
| *** 14.00 | 0.0000 | ....... |
| *** 15.00 | 0.0000 | ....... |
| *** 16.00 | 0.0000 | ....... |
| 17.00 | 0.0209 | −22. DB |

TABLE 9

SEQUENCE OF 90 BITS

000000000010000100110100110111110111111111111111111111011111011001011001000001000000000000

FREQUENCY MAX : 23

| FREQUENCY | MODULUS | MODULUS(DB) |
|---|---|---|
| 1.00 | 0.2573 | 0. DB |
| ••• 2.00 | 0.0000 | ....... |
| ••• 3.00 | 0.0000 | ....... |
| ••• 4.00 | 0.0000 | ....... |
| ••• 5.00 | 0.0000 | ....... |
| ••• 6.00 | 0.0000 | ....... |
| 7.00 | 0.0175 | −23. DB |
| ••• 8.00 | 0.0000 | ....... |
| 9.00 | 0.0656 | −12. DB |
| ••• 10.00 | 0.0000 | ....... |
| 11.00 | 0.0374 | −17. DB |
| ••• 12.00 | 0.0000 | ....... |
| 13.00 | 0.0273 | −19. DB |
| ••• 14.00 | 0.0000 | ....... |
| ••• 15.00 | 0.0000 | ....... |
| ••• 16.00 | 0.0000 | ....... |
| 17.00 | 0.0766 | −11. DB |
| ••• 18.00 | 0.0000 | ....... |
| 19.00 | 0.0668 | −12. DB |
| ••• 20.00 | 0.0000 | ....... |
| ••• 21.00 | 0.0000 | ....... |
| ••• 22.00 | 0.0000 | ....... |
| 23.00 | 0.0103 | −28. DB |

TABLE 10

SEQUENCE OF 150 BITS

000000000000000010000010001010001010101011101011101111101111111111111111111111111111101111111111011101010101000101000100000100000000000000000

| FREQUENCY | MODULUS | MODULUS(DB) |
|---|---|---|
| 1.00 | 0.2604 | 0. DB |
| ••• 2.00 | 0.0000 | ....... |
| ••• 3.00 | 0.0000 | ....... |
| ••• 4.00 | 0.0000 | ....... |
| ••• 5.00 | 0.0000 | ....... |
| ••• 6.00 | 0.0000 | ....... |
| 7.00 | 0.0143 | −25. DB |
| ••• 8.00 | 0.0000 | ....... |
| ••• 9.00 | 0.0000 | ....... |
| ••• 10.00 | 0.0000 | ....... |
| 11.00 | 0.0092 | −29. DB |
| ••• 12.00 | 0.0000 | ....... |
| 13.00 | 0.0267 | −20. DB |
| ••• 14.00 | 0.0000 | ....... |
| ••• 15.00 | 0.0000 | ....... |
| ••• 16.00 | 0.0000 | ....... |
| 17.00 | 0.0313 | −18. DB |
| ••• 18.00 | 0.0000 | ....... |
| 19.00 | 0.0130 | −26. DB |
| ••• 20.00 | 0.0000 | ....... |
| ••• 21.00 | 0.0000 | ....... |
| ••• 22.00 | 0.0000 | ....... |
| 23.00 | 0.0427 | −16. DB |

TABLE 11

SEQUENCE OF 210 BITS

00000000000000000100000000010001000011001000101100110010110110011111011101111111101111111111111111111111111111111101111111101101111100110111101001100110100010011000001000100000000100000000000110000

| FREQUENCY | MODULUS | MODULUS(DB) |
|---|---|---|
| 1.00 | 0.2531 | 0. DB |
| ••• 2.00 | 0.0000 | ....... |
| ••• 3.00 | 0.0000 | ....... |
| ••• 4.00 | 0.0000 | ....... |
| ••• 5.00 | 0.0000 | ....... |
| ••• 6.00 | 0.0000 | ....... |
| 7.00 | 0.0056 | −33. DB |
| ••• 8.00 | 0.0000 | ....... |
| ••• 9.00 | 0.0000 | ....... |
| ••• 10.00 | 0.0000 | ....... |
| 11.00 | 0.0105 | −28. DB |
| ••• 12.00 | 0.0000 | ....... |
| 13.00 | 0.0127 | −26. DB |

TABLE 11-continued

SEQUENCE OF 210 BITS

| FREQUENCY | MODULUS | MODULUS(DB) |
|---|---|---|
| ••• 14.00 | 0.0000 | ....... |
| ••• 15.00 | 0.0000 | ....... |
| ••• 16.00 | 0.0000 | ....... |
| 17.00 | 0.0209 | −22. DB |
| ••• 18.00 | 0.0000 | ....... |
| 19.00 | 0.0353 | −17. DB |
| ••• 20.00 | 0.0000 | ....... |
| 21.00 | 0.0656 | −12. DB |
| ••• 22.00 | 0.0000 | ....... |
| 23.00 | 0.0162 | −24. DB |

TABLE 12

SEQUENCE OF 330 BITS

000000000000000000000000000100000000010000000001010000000010110000000001000001011100000101111100010111110010111110101111111111101111111111101111111111111111111111111111111111110111110111111011111011010111111111101011111110100111111011000011101000000010100000000010000000000100000000000000000000000000

| FREQUENCY | MODULUS | MODULUS(DB) |
|---|---|---|
| 1.00 | 0.2526 | 0. DB |
| ••• 2.00 | 0.0000 | ....... |
| ••• 3.00 | 0.0000 | ....... |
| ••• 4.00 | 0.0000 | ....... |
| ••• 5.00 | 0.0000 | ....... |
| ••• 6.00 | 0.0000 | ....... |
| 7.00 | 0.0050 | −34. DB |
| ••• 8.00 | 0.0000 | ....... |
| ••• 9.00 | 0.0000 | ....... |
| ••• 10.00 | 0.0000 | ....... |
| 11.00 | 0.0077 | −30. DB |
| ••• 12.00 | 0.0000 | ....... |
| 13.00 | 0.0080 | −30. DB |
| ••• 14.00 | 0.0000 | ....... |
| ••• 15.00 | 0.0000 | ....... |
| ••• 16.00 | 0.0000 | ....... |
| 17.00 | 0.0076 | −30. DB |
| ••• 18.00 | 0.0000 | ....... |
| 19.00 | 0.0069 | −31. DB |
| ••• 20.00 | 0.0000 | ....... |
| ••• 21.00 | 0.0000 | ....... |
| ••• 22.0 | 0.0000 | ....... |
| 23.00 | 0.0038 | −37. DB |

TABLE 13

SEQUENCE OF 390 BITS

00000000000000000000000000000000010000000001000000010000010001001001100010011010001001101001100110100110111010011011110011011111011011111101111111111011111111111111111111111111111111111111111111111111111111101111111110111110111101111101100111101100101110110010110011010110010110110010000011001000001000111110110010111011001011001100100010110010000011001000001000010000000100000000010000000000000010000000000000000000

| FREQUENCY | MODULUS | MODULUS(DB) |
|---|---|---|
| 1.00 | 0.2525 | 0. DB |
| ••• 2.00 | 0.0000 | ....... |
| ••• 3.00 | 0.0000 | ....... |
| ••• 4.00 | 0.0000 | ....... |
| ••• 5.00 | 0.0000 | ....... |
| ••• 6.00 | 0.0000 | ....... |
| 7.00 | 0.0049 | −34. DB |
| ••• 8.00 | 0.0000 | ....... |
| ••• 9.00 | 0.0000 | ....... |
| ••• 10.00 | 0.0000 | ....... |
| 11.00 | 0.0073 | −31. DB |
| ••• 12.00 | 0.0000 | ....... |
| 13.00 | 0.0074 | −31. DB |
| ••• 14.00 | 0.0000 | ....... |

TABLE 13-continued

SEQUENCE OF 390 BITS

```
000000000000000000000000000000100
000000010000000001000001000100000
100110000010011010000100110100110 0
110100110111010011011111001101111
101110111110111111110111111111101
111111111111111111111111111111111
111111111111111111111111111011111
111101111111110111101110111111011
001111101100101110110010110011001
011001000101100100000110010000010
001000001000000001000000000010000
000000000000000000000000000
```

| FREQUENCY | MODULUS | MODULUS(DB) |
|---|---|---|
| *** 15.00 | 0.0000 | . . . . . . . |
| *** 16.00 | 0.0000 | . . . . . . . |
| 17.00 | 0.0065 | −32. DB |
| *** 18.00 | 0.0000 | . . . . . . . |
| 19.00 | 0.0057 | −33. DB |
| *** 20.00 | 0.0000 | . . . . . . . |
| *** 21.00 | 0.0000 | . . . . . . . |

TABLE 14

SEQUENCE OF 510 BITS

```
000000000000000000000000000000000
000001000000000100000000010000000
001000100000100010000011001000001
100100010110010001011001100101100
110010111011001011101100111110110
011110111011111011101111111111011
111111101111111110111111111111111
111111111111111111111111111111111
111111111111111111111111111110111
111110110111111011111111110111011
111011011111001101111100110111011
001101110100110011010011001101000
100110100010011000001001100000100
000000010000000000000000000000000
000000000000000
```

| FREQUENCY | MODULUS | MODULUS(DB) |
|---|---|---|
| 1.00 | 0.2523 | 0. DB |
| *** 2.00 | 0.0000 | . . . . . . . |
| *** 3.00 | 0.0000 | . . . . . . . |
| *** 4.00 | 0.0000 | . . . . . . . |
| *** 5.00 | 0.0000 | . . . . . . . |
| *** 6.00 | 0.0000 | . . . . . . . |
| 7.00 | 0.0048 | −34. DB |
| *** 8.00 | 0.0000 | . . . . . . . |
| *** 9.00 | 0.0000 | . . . . . . . |
| *** 10.00 | 0.0000 | . . . . . . . |
| 11.00 | 0.0069 | −31. DB |
| *** 12.00 | 0.0000 | . . . . . . . |
| 13.00 | 0.0068 | −31. DB |
| *** 14.00 | 0.0000 | . . . . . . . |
| *** 15.00 | 0.0000 | . . . . . . . |
| *** 16.00 | 0.0000 | . . . . . . . |
| 17.00 | 0.0057 | −33. DB |
| *** 18.00 | 0.0000 | . . . . . . . |
| 19.00 | 0.0047 | −35. DB |
| *** 20.00 | 0.0000 | . . . . . . . |
| *** 21.00 | 0.0000 | . . . . . . . |
| *** 22.00 | 0.0000 | . . . . . . . |
| 23.00 | 0.0020 | −42. DB |

TABLE 15

SEQUENCE OF 570 BITS

```
000000000000000000000000000000000
000000001000000001000000001000000
000000100000001010000000101000000
110100000001101000001110100000110
100001111010000111101000111110100
011111010011111010011111010111111
111010111111101111111110111111111
011111111110111111111101111111111
111111111111111111111111111111111
111111011111111101111111110111111
111111011111111011111111111011111
110101111110101111100101111111100
101111110001011111000101111000110
111000010111000000101110000101000
000010110000001010000000101000000
010000000001000000000001000000010
000000000000000000000000000000000
00000000
```

| FREQUENCY | MODULUS | MODULUS(DB) |
|---|---|---|
| 1.00 | 0.2523 | 0. DB |
| *** 2.00 | 0.0000 | . . . . . . . |
| *** 3.00 | 0.0000 | . . . . . . . |
| *** 4.00 | 0.0000 | . . . . . . . |
| *** 5.00 | 0.0000 | . . . . . . . |
| *** 6.00 | 0.0000 | . . . . . . . |
| 7.00 | 0.0048 | −34. DB |
| *** 8.00 | 0.0000 | . . . . . . . |
| *** 9.00 | 0.0000 | . . . . . . . |
| *** 10.00 | 0.0000 | . . . . . . . |
| 11.00 | 0.0068 | −31. DB |
| *** 12.00 | 0.0000 | . . . . . . . |
| 13.00 | 0.0067 | −32. DB |
| *** 14.00 | 0.0000 | . . . . . . . |
| *** 15.00 | 0.0000 | . . . . . . . |
| *** 16.00 | 0.0000 | . . . . . . . |
| 17.00 | 0.0054 | −33. DB |
| *** 18.00 | 0.0000 | . . . . . . . |
| 19.00 | 0.0045 | −35. DB |
| *** 20.00 | 0.0000 | . . . . . . . |
| *** 21.00 | 0.0000 | . . . . . . . |
| *** 22.00 | 0.0000 | . . . . . . . |
| 23.00 | 0.0019 | −43. DB |

TABLE 16

SEQUENCE OF 630 BITS

```
000000000000000000000000000000010
000000000000000100000000000000000
010000000100100000010000010000000
001010000100100100110100000010010
010011000001011010011010011011110
010010111010010110110111011010011
011010111101011111101101111110011
111110110111101111111111111111111
011111111111111111111111111111111
111111111111111111111111111111111
111111111111110111111111111111111
101111111111111111111111101101111
111101111101101111101011111101101
101100101111101101101100101110100
101101100101100101101010001101100
100100100000101100100100100000101
000000100100000100000000100100000
100000000000000010000000000000000
000100000000000000000000000000000
000
```

| FREQUENCY | MODULUS | MODULUS(DB) |
|---|---|---|
| 1.00 | 0.2472 | 0. DB |
| *** 2.00 | 0.0000 | . . . . . . . |
| *** 3.00 | 0.0000 | . . . . . . . |
| *** 4.00 | 0.0000 | . . . . . . . |
| *** 5.00 | 0.0000 | . . . . . . . |
| *** 6.00 | 0.0000 | . . . . . . . |
| *** 7.00 | 0.0000 | . . . . . . . |
| *** 8.00 | 0.0000 | . . . . . . . |
| 9.00 | 0.0035 | −37. DB |
| *** 10.00 | 0.0000 | . . . . . . . |
| 11.00 | 0.0032 | −38. DB |
| *** 12.00 | 0.0000 | . . . . . . . |
| 13.00 | 0.0069 | −31. DB |
| *** 14.00 | 0.0000 | . . . . . . . |
| *** 15.00 | 0.0000 | . . . . . . . |
| *** 16.00 | 0.0000 | . . . . . . . |
| 17.00 | 0.0147 | −25. DB |
| *** 18.00 | 0.0000 | . . . . . . . |
| 19.00 | 0.0028 | −39. DB |
| *** 20.00 | 0.0000 | . . . . . . . |
| *** 21.00 | 0.0000 | . . . . . . . |
| *** 22.00 | 0.0000 | . . . . . . . |

TABLE 16-continued

SEQUENCE OF 630 BITS

```
0000000000000000000000000000000010
0000000000000001000000000000000000
0100000100100000001000001001 0000
0010100000100100100110100000010010
0100110000010110100110101 0011011
0100101110100110110110111 1010011
0110110111101011111101101 1111011
1111110110111101111111111 11111111
0111111111111111110111111 11111111
1111111111111111111111111 11111111
1111111111111101111111111 11111111
1011111111111111110111101 101 1111
1111011110110111110101111 101101
1011001011110110110110010 1110100
1011011001011001001011010 00101100
1001001000010110010010010 0000101
0000001001000001000000000 100100000
1000000000000000001000000 000000000
0001000000000000000000000 00000000
000
```

| FREQUENCY | MODULUS | MODULUS(DB) |
|---|---|---|
| 23.00 | 0.0013 | −45. DB |

TABLE 17

SEQUENCE OF 630 BITS

```
0000000000000000000000000000000000
0100000000000000001000000000000010
0001000000000001000001000001 0010
0100010100000100100100010100 10010
0110100010100100100110100110 10011
0110110101110100110110101 10111011
0110111101011101101101111 1011111
0111111111110111101111111 11111011
1111111111111110111111111 11111111
1111111111111111111111111 11111111
1111111111111111111110111 11111111
1111101111111101111101111 11111111
1011111011110110110111010 1111101
1011011101011011011001011 10101101
1011001011001011001001001 01000101
1001001001010001001001000 00101000
1001001000001000001000000 000000100
0001000000000001000000000 00000000
1000000000000000000000000 00000000
000
```

| FREQUENCY | MODULUS | MODULUS(DB) |
|---|---|---|
| 1.00 | 0.2483 | 0. DB |
| *** 2.00 | 0.0000 | ....... |
| *** 3.00 | 0.0000 | ....... |
| *** 4.00 | 0.0000 | ....... |
| *** 5.00 | 0.0000 | ....... |
| *** 6.00 | 0.0000 | ....... |
| *** 7.00 | 0.0000 | ....... |
| *** 8.00 | 0.0000 | ....... |
| 9.00 | 0.0100 | −28. DB |
| *** 10.00 | 0.0000 | ....... |
| 11.00 | 0.0048 | −34. DB |
| *** 12.00 | 0.0000 | ....... |
| 13.00 | 0.0008 | −50. DB |
| *** 14.00 | 0.0000 | ....... |
| *** 15.00 | 0.0000 | ....... |
| *** 16.00 | 0.0000 | ....... |
| 17.00 | 0.0082 | −30. DB |
| *** 18.00 | 0.0000 | ....... |
| 19.00 | 0.0204 | −22. DB |
| *** 20.00 | 0.0000 | ....... |
| *** 21.00 | 0.0000 | ....... |
| *** 22.00 | 0.0000 | ....... |
| 23.00 | 0.0049 | −34. DB |

TABLE 18

SEQUENCE OF 1050 BITS

```
00000000000000000000000010000000
00000000000000000000000000000000
01000000010000000000000000001000
01000000001000000010000001000000
00000100001001000011000000100000
10100100001000100001001000011010 0
00110000010010010100110001100 10
00011010010110100011100100101 0011
01011011000111010010110100111101 1
00111001101011011010111100111101
00111101101111011011110110101 111
10111111199111101101111011111 1111
11011111110111111101111111101111 0
11111111111111111110111111101 1111
11111111111111111111111111111 1111
11101111111111111111111111111 1111
11111111111111111111101111111 1111
1111111111111111111111111111111 01
11111101111111111111111111111 01101
111111101111110111111110111111111
11011110110111100111111011111010
011111010110110101100111001101111
00101101001011100011011010110 0101
00100111000101101001011000010 0110
00110010100100101000001100001 0110
00010010000100010000100101000001 0
00000011000010010000100000000000 1
0000000100000001000000000100001000
00000000000000001000000001 00000000
000000000000000000000000000 00000000
1000000000000000000000000000
```

| FREQUENCY | MODULUS | MODULUS(DB) |
|---|---|---|
| 1.00 | 0.2434 | 0. DB |
| *** 2.00 | 0.0000 | ....... |
| *** 3.00 | 0.0000 | ....... |
| *** 4.00 | 0.0000 | ....... |
| *** 5.00 | 0.0000 | ....... |
| *** 6.00 | 0.0000 | ....... |
| *** 7.00 | 0.0000 | ....... |
| *** 8.00 | 0.0000 | ....... |
| *** 9.00 | 0.0000 | ....... |
| *** 10.00 | 0.0000 | ....... |
| 11.00 | 0.0010 | −47. DB |
| *** 12.00 | 0.0000 | ....... |
| 13.00 | 0.0040 | −36. DB |
| *** 14.00 | 0.0000 | ....... |
| *** 15.00 | 0.0000 | ....... |
| *** 16.00 | 0.0000 | ....... |
| 17.00 | 0.0063 | −32. DB |
| *** 18.00 | 0.0000 | ....... |
| 19.00 | 0.0028 | −39. DB |
| *** 20.00 | 0.0000 | ....... |
| *** 21.00 | 0.0000 | ....... |

TABLE 19
SEQUENCE OF 1050 BITS

```
000000000000000000000000000000000
000000000000000000000010000000000
000000000000000000100000000000010
000001000000000100000000000010000
000100010000010100000001010000000
100010000010100010001010100000101
010000101000100101010001010101011
100010101010001010100010101011100
010101011101010111010101011100000
101011101010111011101011111010101
111101010111011101011110111101111
111010111111101011111011111111011
011111111110111111111101111110011
111111110111111111111111111111111
111111011111111111111111111111111
111111111111111111111111111111111
111111111111111011011111111111111
111111111111111101111111111101111
111011111110111111111101111111111
011101111101011111111010111111011
101111010110111101010101111010101
111101011101110101011101010100011
101010101110101011101010100011101
010100010101000101010101000110101
10001010100010001010000010101000 0
01010100010001010000010000010000
101000000101000001000100000000100
000000001000000000100000000100000
000000010000000000000000000000000
001000000000000000000000000000000
000000000000000000000000000
```

| FREQUENCY | MODULUS | MODULUS (DB) |
|---|---|---|
| 1.00 | 0.2512 | 0. DB |
| *** 2.00 | 0.0000 | ....... |
| *** 3.00 | 0.0000 | ....... |
| *** 4.00 | 0.0000 | ....... |
| *** 5.00 | 0.0000 | ....... |
| *** 6.00 | 0.0000 | ....... |
| *** 7.00 | 0.0000 | ....... |
| *** 8.00 | 0.0000 | ....... |
| *** 9.00 | 0.0000 | ....... |
| *** 10.00 | 0.0000 | ....... |
| 11.00 | 0.0012 | −47. DB |
| *** 12.00 | 0.0000 | ....... |
| 13.00 | 0.0008 | −50. DB |
| *** 14.00 | 0.0000 | ....... |
| *** 15.00 | 0.0000 | ....... |
| *** 16.00 | 0.0000 | ....... |
| 17.00 | 0.0032 | −38. DB |
| *** 18.00 | 0.0000 | ....... |
| 19.00 | 0.0038 | −36. DB |
| *** 20.00 | 0.0000 | ....... |

RECAPITULATORY TABLE

| Length of the sequence | first nonzero harmonic | ANHARMONICITY ORDERS | | | | | | REFERENCE TO |
|---|---|---|---|---|---|---|---|---|
| | | 2 MODES | 3 MODES | 4 MODES | 5 MODES | 7 MODES | 9 MODES | |
| 12 | 4 | 2 | 2 | | | | | Table 1 |
| 18 | 5 | 3 | 3 | | | | | Tables 2 and 3 |
| 24 | 5 | 2 | 2 | 2 | | | | Table 4 |
| 30 | 5 | 3 | 5 | | | | | Table 5 |
| 42 | 5 | 3 | 7 | | | | | Table 6 |
| 66 | 5 | 3 | 11 | | | | | Table 7 |
| 78 | 5 | 3 | 13 | | | | | Table 8 |
| 90 | 7 | 5 | 3 | | 3 | | | Table 9 |
| 150 | 7 | 3 | 5 | | 5 | | | Table 10 |
| 210 | 7 | 5 | 7 | | 3 | | | Table 11 |
| 330 | 7 | 5 | 11 | | 3 | | | Table 12 |
| 390 | 7 | 5 | 13 | | 3 | | | Table 13 |
| 510 | 7 | 5 | 17 | | 3 | | | Table 14 |
| 570 | 7 | 5 | 19 | | 3 | | | Table 15 |
| 630 a | 9 | 7 | 3 | | 3 | 5 | | Table 16 |
| 630 b | 9 | 5 | 3 | | 7 | 3 | | Table 17 |
| 1050 a | 11 | 7 | 5 | | 5 | 3 | | Table 18 |
| 1050 b | 11 | 3 | 7 | | 5 | 5 | | Table 19 |

Figure 13:
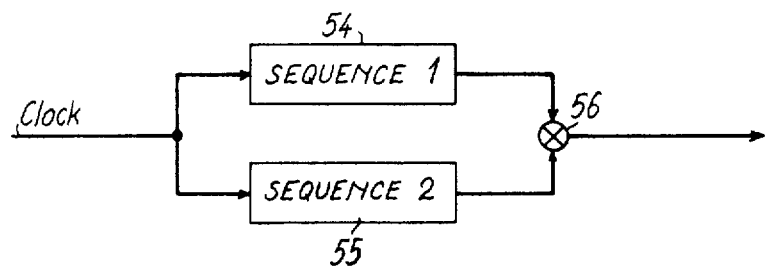
FIG. 13 represents an amplitude modulator using anharmonic sequence generators.

FIG. 13 represents a digital amplitude modulator employing anharmonic sequence generators and having a harmonic distorsion as small as one's will. Reference numberals 54 and 55 designate two anharmonic sequence generators of numbers of bits N and N' driven by a clock (not represented). The outputs of the two generators are connected to an exclusive OR-gate 56. The output signal of the OR-gate has a spectrum formed of two lines without any other undesirable lines.

Figure 14:
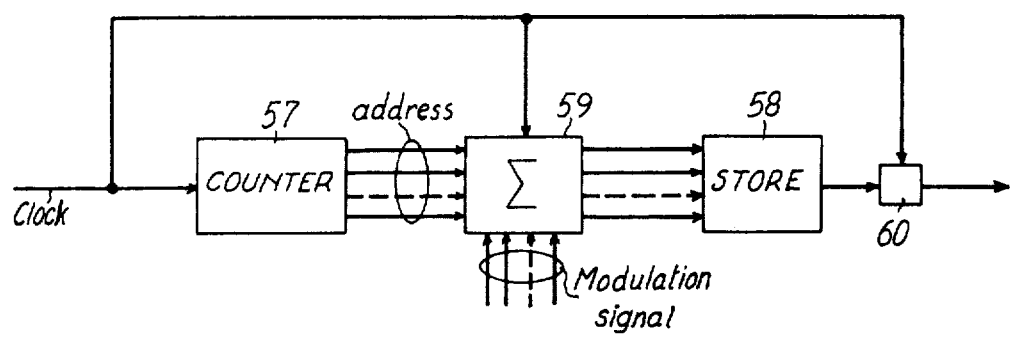
FIG. 14 represents a phase modulator using anharmonic sequence generator.

FIG. 14 represents a digital phase modulator employing an anharmonic sequence generator. The generator is of the type of FIG. 8 and comprises a clock (not represented), a counter 57, a read only memory 58 containing the sequence and a D-type flipflop 60. Between counter 57 and read only memory 58 is inserted an adding circuit 59 which adds the address supplied by the counter and the digital value of the modulation signal. It is clear that the phase of the sine digital sequence is controlled by the modulation signal.

Figure 15:
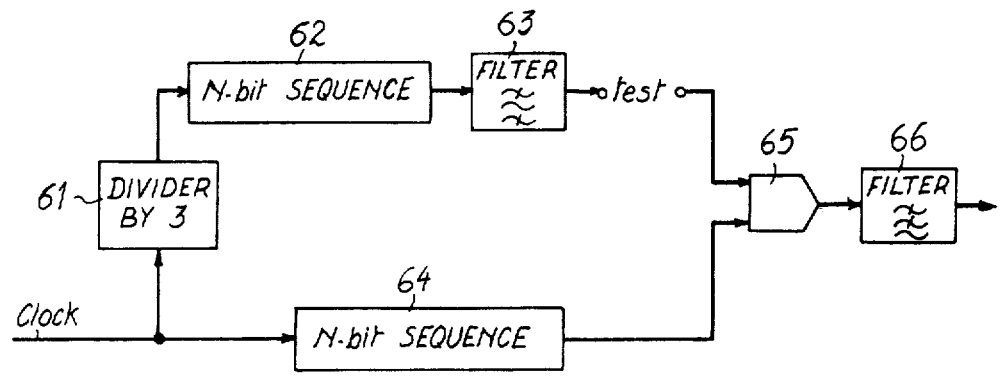
FIG. 15 represents a device for measuring the harmonic 3 distorsion factor of four-terminal networks.

FIG. 15 represents an analyzer of third harmonic. The anharmonic sequence generators 62 and 64 are driven by the same clock (not represented), the first through a frequency divider by 3 and the second directly. It results that the output signal of 64 is exactly the third harmonic of the output signal of 62. A low-pass filter 63 is connected at the output of generator 62. The outputs of filter 63 and anharmonic sequence generator 64 are connected to a switch 65 followed by a low-pass filter 66 and an apparatus to be tested can be inserted in the path between 63 and 65. Actuation of switch 65 allows to receive selectively the third harmonic generated by generator 64 or the third harmonic supplied by the tested apparatus. The distorsion factor for harmonic 3 of the apparatus can thus be determined.

I claim:

1. A generator of anharmonic binary sequences having N bits and harmonics of orders $k_1, k_2 .. k_m$ equal to zeros according respectively to modes $p_1, p_2 .. p_m$ derived from a starting anharmonic binary sequence having N' bits and harmonics of orders $k_1, k_2 .. k_{m-1}$ equal to zeros according respectively to modes $p_1, p_2 .. p_{m-1}$, said generator comprising:

a. means for computing a number N equal to the least common multiple of the number N' and the product $k_m p_m$;

b. means for deriving from the starting anharmonic binary sequence with N' bits an intermediary binary sequence by substituting each one bit of the starting sequence by a one bit followed by (N/N')−1 zero bits and each zero bit of the starting sequence by N/N' zero bits;

c. means for shifting said intermediary binary sequence successively by $N/k_m p_m$, $2(N/k_m p_m)$. . .

$(p_m-1)(N/k_m p_m)$ bits, thereby obtaining $(p_m-1)$ shifted binary sequences; and d. means for adding $p_m$ binary sequences, said $p_m$ binary sequences being said $(p_m-1)$ shifted binary sequences and said intermediary binary sequence.

2. A generator of anharmonic binary sequences according to claim 1, further comprising a device for chacking the permissibility of a selected mode $p_m$, said device comprising a. multiplication means for performing the $m$ products $k_i p_i$ of the order of anharmonicity $k_i$ by the related mode $p_i$, the $i$ subscrit being successively equal to the $m$ following values: 1, 2 . . . $m$;

b. fraction calculation means for performing, for each $i$ value, all the $2p_i-1$ fractions corresponding to a particular $i$ value, whose denominators are said $k_i p_i$ products and whose numerators are successively all the positive and negative integers comprised between $-p_i$ and $+p_i$;

c. addition means for adding $m$ fractions, said $m$ fractions being successively chosen at the rate of one fraction in each group of said $2p_i-1$ fractions corresponding to a particular $i$ value; and d. exclusion means for excluding $p_m$ as selected mode when an addition of said $m$ fractions is equal to zero.

3. A generator of anharmonic binary sequences having N bits and harmonics of orders $k_1, k_2 .. k_m$ equal to zero according respectively to modes $p_1, p_2 .. p_m$ derived from a starting anharmonic binary sequence having N' bits and harmonics of orders $k_1, k_2 .. k_{m-1}$ equal to zero according respectively to modes $p_1, p_2 .. p_{m-1}$, said generator comprising:

a. means for computing a number N equal to the least common multiple of the number N' and the product $k_m p_m$;

b. a shift register having N stages and $(p_m-1)$ outputs spaced apart every $N/k_m p_m$ stages;

c. means for applying to said shift register a sequence of N bits formed of the sequence of N' bits followed by (N-N') zeros; and d. an OR-gate connected to the input and outputs of said shift register.

4. A generator of anharmonic binary sequences according to claim 3, further comprising an inhibiting circuit having inputs connected to the input and outputs of the shift register and generating an inhibiting signal when at least two of its inputs simultaneously conveyed a one bit.

5. A generator of anharmonic binary sequences having N bits and harmonics of orders $k_1, k_2 .. k_m$ equal to zero according respectively to modes $p_1, p_2 .. p_m$ comprising:

a. means for computing a number N equal to the least common multiple of the products $k_1 p_1, k_2 p_2 .. k_m p_m$;

b. $m$ shift registers, the $i^{th}$ shift register having $(p_i-1)(N/k_i p_i)$ stages and $(p_i-1)$ outputs spaced apart every $(N/k_i p_i)$ stages, the $i$ index being successively equal to the $m$ following values: 1, 2 . . . $m$;

c. means for applying to said first shift register a sequence of N bits formed by a one followed by N — 1) zeros;

d. $m$ OR-gates, the $i^{th}$ OR-gate being connected to the input and outputs of said $i^{th}$ shift register; and e. means for applying to said second, third . . . $m^{th}$ shift register, the output signal of said first, second . . . $(m-1)^{th}$ OR-gate, respectively.

6. A generator of an anharmonic binary sequence of N bits, said sequence being associated with a polynomial $\Sigma s_i X^i$ where the coefficients $s_i$ are respectively equal to the binary values of the terms of serial number $i$ in the sequence, $i$ varying from 0 to (N — 1), said generator comprising:

a. means for deriving from the polynomial associated to the sequence a characteristic polynomial equal to the ratio of the polynomial $1+X^N$ by the greatest common divisor of $1+X^N$ and $\Sigma s_i X^i$;

b. means for deriving from the polynomial associated to the sequence an initialization polynomial equal to the ratio of the polynomial associated to the sequence by the greatest common divisor of $1+X^N$ and $\Sigma s_i X^i$;

c. a shift register having stages respectively corresponding to the coefficients of the characteristic polynomial and being connected therebetween by direct connections corresponding to the zero coefficients of the characteristic polynomial and by exclusive OR-gates corresponding to the nonzero coefficients of the characteristic polynomial, said shift register being looped from its output together to the input thereof and said exclusive OR-gates inputs; and d. means to enter into said shift register binary digits equal to the coefficients of the initialization polynomial.

* * * * *